(12) United States Patent
Lee et al.

(10) Patent No.: US 11,616,269 B2
(45) Date of Patent: Mar. 28, 2023

(54) SECONDARY BATTERY AND BATTERY MODULE

(71) Applicant: LG Chem, Ltd., Seoul (KR)

(72) Inventors: Han Young Lee, Daejeon (KR); Ji Su Lee, Daejeon (KR)

(73) Assignee: LG Energy Solution, Ltd.

( * ) Notice: Subject to any disclaimer, the term of this patent is extended or adjusted under 35 U.S.C. 154(b) by 34 days.

(21) Appl. No.: 16/981,776

(22) PCT Filed: Dec. 6, 2019

(86) PCT No.: PCT/KR2019/017190
§ 371 (c)(1),
(2) Date: Sep. 17, 2020

(87) PCT Pub. No.: WO2020/166803
PCT Pub. Date: Aug. 20, 2020

(65) Prior Publication Data
US 2021/0013473 A1    Jan. 14, 2021

(30) Foreign Application Priority Data

Feb. 14, 2019    (KR) .......................... 10-2019-0017331

(51) Int. Cl.
*H01M 50/342*    (2021.01)
*H01M 50/572*    (2021.01)
*H01M 50/105*    (2021.01)

(52) U.S. Cl.
CPC ..... *H01M 50/3425* (2021.01); *H01M 50/105* (2021.01); *H01M 50/572* (2021.01); *H01M 2200/20* (2013.01)

(58) Field of Classification Search
CPC ........... H01M 50/3425; H01M 50/105; H01M 50/572; H01M 2200/20; H01M 50/578; H01M 50/618; H01M 50/425
See application file for complete search history.

(56) References Cited

U.S. PATENT DOCUMENTS

| 8,042,264 B2 * | 10/2011 | Rosenthal ................. F01L 9/20 |
| | | 29/25.03 |
| 2006/0246345 A1 * | 11/2006 | Yoon ................... H01M 10/482 |
| | | 429/7 |

(Continued)

FOREIGN PATENT DOCUMENTS

| CN | 1870930 A | 11/2006 |
| CN | 101123317 A | 2/2008 |

(Continued)

OTHER PUBLICATIONS

European Search Report for Application No. EP 19915222, dated May 13, 2021, 6 pages.

(Continued)

*Primary Examiner* — Matthew T Martin
*Assistant Examiner* — Bartholomew A Hornsby
(74) *Attorney, Agent, or Firm* — Lerner, David, Littenberg, Krumholz & Mentlik, LLP

(57) ABSTRACT

A secondary battery according to an embodiment of the present invention for solving the above problems includes: an electrode assembly formed by alternately stacking an electrode and a separator; a battery case accommodating the electrode assembly within a cup part of the battery case; a piezoelectric element disposed outside the cup part, the piezoelectric element being configured to receive a pressure when the battery case expands in volume, thereby supplying power to the piezoelectric element; and a punching part that has a sharp end that extends toward a target location on the battery case, the punching part being configured to punch a hole in the target location of the battery case when the power is applied to the piezoelectric element.

14 Claims, 8 Drawing Sheets

(56) References Cited

U.S. PATENT DOCUMENTS

| | | |
|---|---|---|
| 2006/0251965 A1 | 11/2006 | Nagayama et al. |
| 2007/0122691 A1 | 5/2007 | Lee et al. |
| 2008/0038628 A1 | 2/2008 | Yamauchi et al. |
| 2009/0173632 A1 | 7/2009 | Nagayama et al. |
| 2011/0129702 A1 | 6/2011 | Ahn et al. |
| 2012/0003517 A1 | 1/2012 | Choi et al. |
| 2012/0025671 A1 | 2/2012 | Chiang et al. |
| 2012/0276427 A1 | 11/2012 | Kim |
| 2013/0129914 A1 | 5/2013 | Nagayama et al. |
| 2014/0147712 A1 | 5/2014 | Lee |
| 2015/0320295 A1 | 11/2015 | Belson et al. |
| 2016/0164023 A1 | 6/2016 | Choi et al. |
| 2018/0062133 A1 | 3/2018 | Kim |
| 2018/0183027 A1 | 6/2018 | Lee et al. |
| 2019/0020018 A1* | 1/2019 | Zeng ................. H01M 10/46 |

FOREIGN PATENT DOCUMENTS

| | | | |
|---|---|---|---|
| CN | 105702167 A | | 6/2016 |
| CN | 207398300 U | | 5/2018 |
| DE | 102014201162 A1 | | 7/2015 |
| EP | 3300139 A1 | | 3/2018 |
| JP | 2002093398 A | * | 3/2002 |
| JP | 2002093398 A | | 3/2002 |
| JP | 2006185708 A | | 7/2006 |
| JP | 2011233604 A | | 11/2011 |
| JP | 2014154292 A | | 8/2014 |
| KR | 20000051638 A | | 8/2000 |
| KR | 20070056494 A | | 6/2007 |
| KR | 100803870 B1 | | 2/2008 |
| KR | 20110058381 A | | 6/2011 |
| KR | 20110075789 A | | 7/2011 |
| KR | 20120002862 A | | 1/2012 |
| KR | 20130019477 A | | 2/2013 |
| KR | 20130063755 A | | 6/2013 |
| KR | 20160021347 A | | 2/2016 |
| KR | 20170050926 A | | 5/2017 |
| KR | 20170084789 A | | 7/2017 |
| KR | 20180024861 A | | 3/2018 |
| WO | 2011132723 A1 | | 10/2011 |
| WO | 2015110275 A1 | | 7/2015 |

OTHER PUBLICATIONS

International Search Report for Application No. PCT/KR2019/017190 dated Mar. 13, 2020, 2 pages.
Search Report dated Mar. 28, 2022 from the Office Action for Chinese Application No. 201980017199X dated Apr. 1, 2022, 2 pgs.

* cited by examiner

SECONDARY BATTERY AND BATTERY MODULE

CROSS-REFERENCE TO RELATED APPLICATION

The present application is a national phase entry under 35 U.S.C. § 371 of International Patent Application No. PCT/KR2019/017190, filed on Dec. 6, 2019, published in Korean, which claims priority from Korean Patent Application No. 10-2019-0017331, filed on Feb. 14, 2019, the disclosures of which are hereby incorporated by reference in their entireties.

TECHNICAL FIELD

The present invention relates to a secondary battery and a battery module, and more particularly, to a secondary battery, in which a gas generated in a battery case is quickly discharged to prevent explosion and secure stability when an abnormal operation occurs, and a battery module.

BACKGROUND ART

In general, secondary batteries include nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

In order to manufacture an electrode assembly, a cathode, a separator, and an anode are manufactured and stacked. Specifically, cathode active material slurry is applied to a cathode collector, and anode active material slurry is applied to an anode collector to manufacture a cathode and an anode. Also, when the separator is interposed and stacked between the manufactured cathode and anode, unit cells are formed. The unit cells are stacked on each other to form an electrode assembly. Also, when the electrode assembly is accommodated in a specific case, and an electrolyte is injected, the secondary battery is manufactured.

In the related art, when the secondary battery abnormally operates such as being exposed to a high temperature or excessively charged or discharged, the separator is contracted due to generated heat, and thus, the cathode and the anode directly contact each other to increase in possibility of the short circuit. Due to the short circuit, rapid electron transfer may occur inside the battery, and thus, when the heat generation and side reactions occur, the secondary battery may be exploded to cause a safety problem. In particular, when an electrical malfunction occurs, such as the overcharge, the overdischarge, or the external short circuit, since high current flows, and the thermal conductivity of the collector is low, the temperature of the collector is higher than that of the active material layer. Thereafter, the heat may be diffused, and thus, thermal, chemical, and electrochemical reactions of components such as the active materials and the electrolytes may be added to lead to thermal runaway.

DISCLOSURE OF THE INVENTION

Technical Problem

An object of the present invention is to provide a secondary battery, in which a gas generated in a battery case is quickly discharged to prevent explosion and secure stability when an abnormal operation occurs, and a battery module.

The objects of the present invention are not limited to the aforementioned object, but other objects not described herein will be clearly understood by those skilled in the art from descriptions below.

Technical Solution

A secondary battery according to an embodiment of the present invention for solving the above problems includes: an electrode assembly formed by alternately stacking an electrode and a separator; a battery case accommodating the electrode assembly within a cup part of the battery case; a piezoelectric element disposed outside the cup part, the piezoelectric element being configured to receive a pressure when the battery case expands in volume, thereby supplying power to the piezoelectric element; and a punching part that has a sharp end that extends toward a target location on the battery case, the punching part being configured to punch a hole in the target location of the battery case when the power is applied to the piezoelectric element.

Also, the punching part may be made of an electroactive polymer (EAP).

Also, the piezoelectric element may be attached to an outer surface of the cup part.

Also, the piezoelectric element may be attached to a central portion of the cup part.

Also, the piezoelectric element may have a shape corresponding to a shape of a portion of the cup part.

Also, the secondary battery may further comprise conductive wire connected to the piezoelectric element and to another end of the punching part.

Also, the target location may be on the cup part of the battery case.

Also, the punching part may be in close contact with a sealing part of the battery case.

Also, another end of the punching part may be disposed at a vertex of the battery case.

Also, the punching part may be in close contact with a portion of the sealing part extending along a peripheral edge of the secondary battery.

A battery module according to an embodiment of the present invention for solving the above problems includes: a secondary battery including an electrode assembly formed by alternately stacking an electrode and a separator, a battery case accommodating the electrode assembly within a cup part of the battery case; a piezoelectric element disposed outside the cup part, the piezoelectric element being configured to receive a pressure when the battery case expands in volume, thereby supplying the power to the piezoelectric element; and a punching part that has a sharp end that extends toward a target location on the battery case, the punching part being configured to punch a hole in the target location of the battery case when the power is applied to the piezoelectric element; and a housing configured to accommodate the secondary battery therein.

Also, the punching part may be made of an electroactive polymer (EAP).

Also, the piezoelectric element may be attached to an inner surface of the housing.

Also, the punching part may be in close contact with an inner edge of the housing.

Also, the target location may be on the cup part of the battery case.

Also, the present invention may provide a battery pack including the battery module and provide a device including the battery pack.

The device may include a computer, a notebook, a smart phone, a mobile phone, a tablet PC, a wearable electronic device, a power tool, an electric vehicle (EV), a hybrid electric vehicle (HEV), a plug-in hybrid electric vehicle (PHEV), or a power storage device, but is not limited thereto.

The structures of the battery pack and the device and the method for manufacturing them are well known in the art, and thus their detailed descriptions will be omitted herein.

Particularities of other embodiments are included in the detailed description and drawings.

Advantageous Effects

The embodiments of the present invention may have at least the following effects.

When the abnormal operation occurs, if the battery case is expanded in volume to produce the power from the piezoelectric element, the punching part may punch the battery case to allow the gas generated in the battery case to be quickly discharged, thereby preventing the explosion and ensuring the stability.

The effects of the prevent invention are not limited by the aforementioned description, and thus, more varied effects are involved in this specification.

MODE FOR CARRYING OUT THE INVENTION

Figure 1:
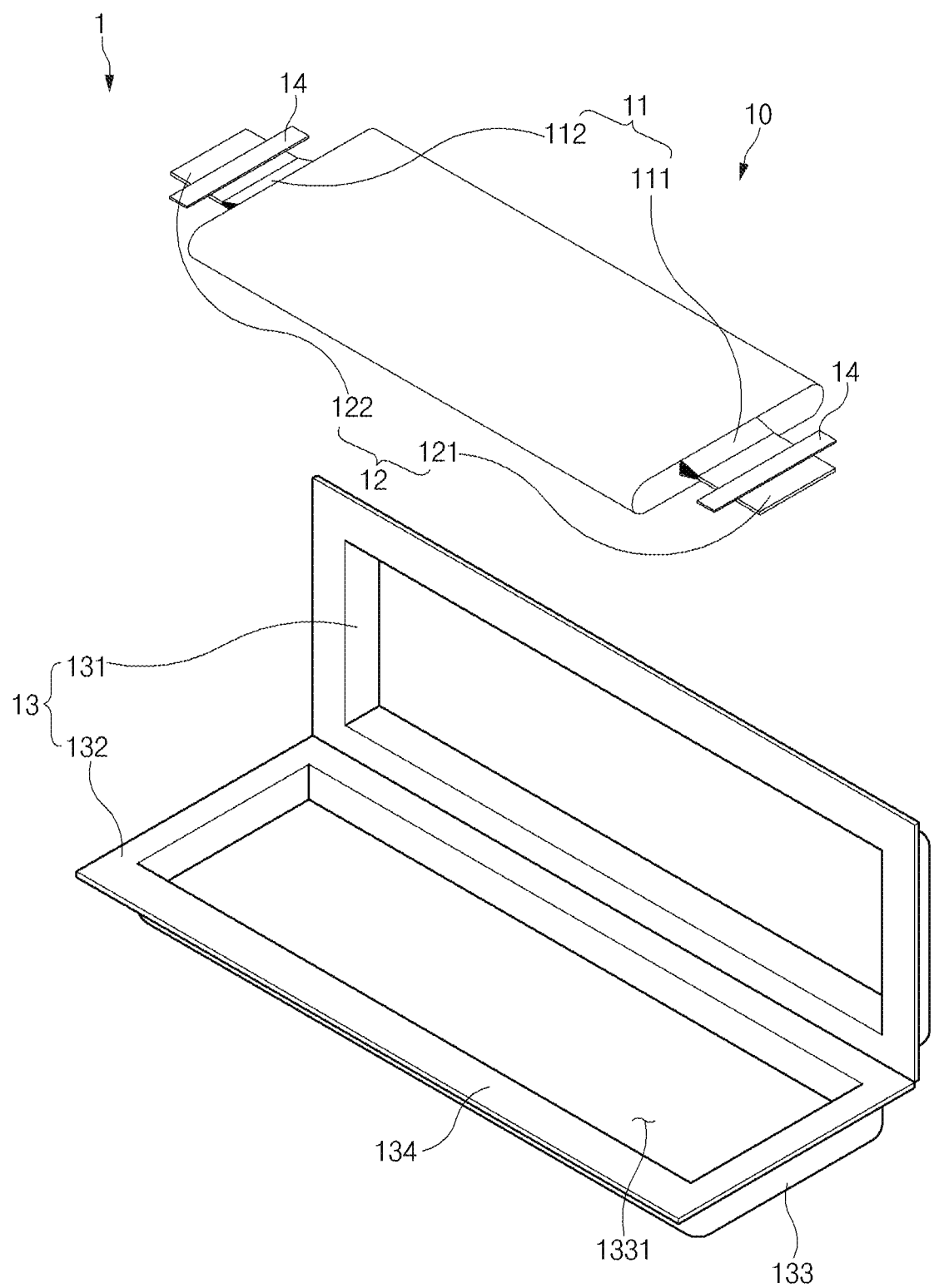
FIG. 1 is an assembly view of a secondary battery according to an embodiment of the present invention.

Advantages and features of the present invention, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may comprise plural forms unless specifically mentioned. The meaning of "comprises" and/or "comprising" does not exclude other components besides a mentioned component.

Hereinafter, preferred embodiments will be described in detail with reference to the accompanying drawings.

Figure 2:
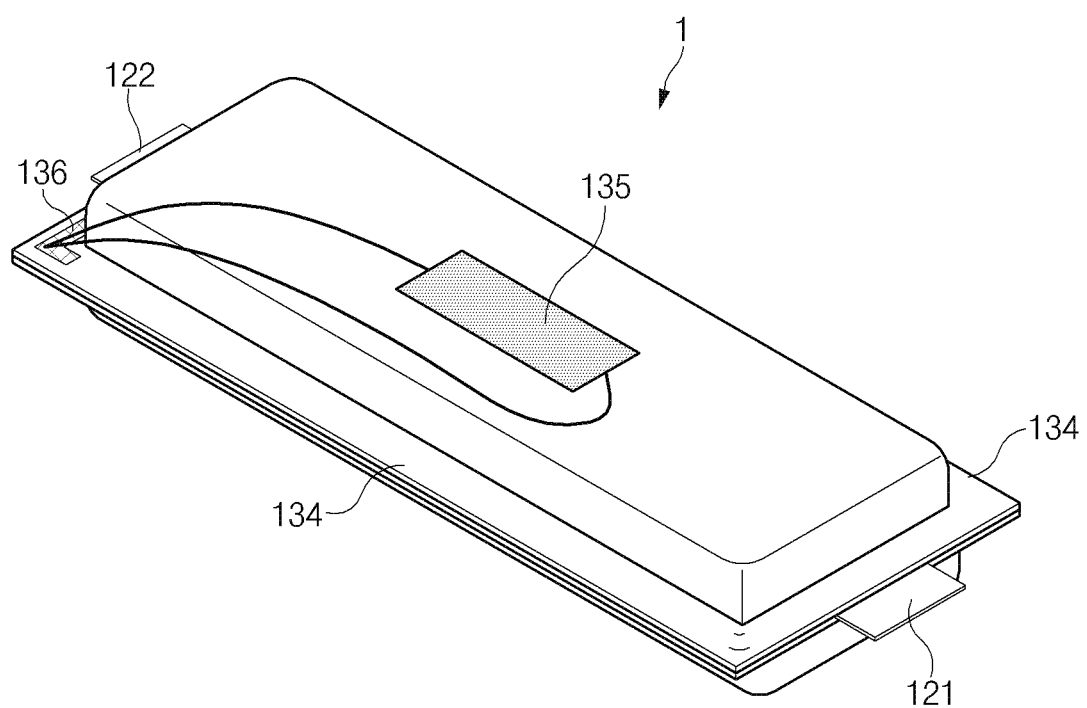
FIG. 2 is a perspective view of the secondary battery according to an embodiment of the present invention.

FIG. 1 is an assembly view of a secondary battery 1 according to an embodiment of the present invention, and FIG. 2 is a perspective view of the secondary battery 1 according to an embodiment of the present invention.

According to an embodiment of the present invention, when an abnormal operation occurs, if a battery case 13 is expanded in volume to produce power from a piezoelectric element 135, a punching part 136 may punch the battery case 13 to allow a gas generated in the battery case 13 to be quickly discharged, thereby preventing explosion and ensuring stability.

For this, the secondary battery 1 according to an embodiment of the present invention includes:

an electrode assembly 10 formed by alternately stacking an electrode and a separator; a battery case 13 that accommodates the electrode assembly 10 therein; a piezoelectric element 135 disposed outside a cup part 133 accommodating the electrode assembly 10 in the battery case 13 to receive a pressure when the battery case 13 is expanded in volume, thereby supplying the power to the outside; and a punching part 136 which has sharp one end 1361 and of which the one end 1361 extends toward the battery case 13 to punch the battery case 13 when the power is applied from the piezoelectric element 135.

The electrode assembly 10 is formed by alternately stacking the electrode and the separator. First, slurry in which an electrode active material, a binder, and a plasticizer are mixed with each other is applied to a cathode collector and an anode collector to manufacture a cathode and an anode. Thereafter, the cathode and the anode are respectively stacked on both sides of the separator to form an electrode assembly 10 having a predetermined shape. Then, the electrode assembly is inserted into the battery case 13, an electrolyte is injected into the battery case 13, and a sealing process is performed.

Specifically, the electrode assembly 10 includes two types of electrodes, such as the cathode and the anode, and the separator interposed between the electrodes to insulate the electrodes from each other. The electrode assembly 10 may be a stack type, a jelly roll type, a stacked and folding type, or the like. Each of the two types of electrodes, i.e., the cathode and the anode has a structure in which active material slurry is applied to the electrode collector having a metal foil or metal mesh shape. The slurry may be usually formed by agitating a granular active material, an auxiliary conductor, a binder, and a plasticizer with a solvent added. The solvent may be removed in the subsequent process.

As illustrated in FIG. 1, the electrode assembly 10 includes an electrode tab 11. The electrode tabs 11 are respectively connected to the cathode and the anode of the electrode assembly 10 to protrude outward from one side of the electrode assembly 10, thereby providing a path, through which electrons move, between the inside and outside of the electrode assembly 10. A collector of the electrode assembly 10 is constituted by a portion coated with an electrode active material and a distal end, on which the electrode active material is not applied, i.e., a non-coating portion. Also, the electrode tab 11 may be formed by cutting the non-coating portion or by connecting a separate conductive member to the non-coating portion through ultrasonic welding. As illustrated in FIG. 1, the electrode tabs 11 may protrude from one side of the electrode assembly 10 in directions different from each other, but the present invention is not limited thereto. For example, the electrode tabs 11 may protrude in the same direction.

In the electrode assembly 10, the electrode lead 12 is connected to the electrode tab 11 through spot welding. Also, a portion of the electrode lead 12 is surrounded by an insulation part 14. The insulation part 14 may be disposed to be limited within a sealing part 134, at which an upper case 131 and a lower case 132 of the battery case 13 are thermally fused, so that the electrode lead 12 is bonded to the battery case 13. Also, electricity generated from the electrode assembly 10 may be prevented from flowing to the battery case 13 through the electrode lead 12, and the sealing of the battery case 13 may be maintained. Thus, the insulation part 14 may be made of a nonconductor having non-conductivity, which is not electrically conductive. In general, although an insulation tape which is easily attached to the electrode lead 12 and has a relatively thin thickness is mainly used as the insulation part 14, the present invention is not limited thereto. For example, various members may be used as the insulation part 14 as long as the members are capable of insulating the electrode lead 12.

One end of the electrode lead 12 is connected to the electrode tab 11, and the other end of the electrode lead 12 protrudes to the outside of the battery case 13. That is, the electrode lead 12 includes a cathode lead 121 having one end connected to a cathode tab 111 to extend in a direction in which the cathode tab 111 protrudes and an anode lead 122 having one end connected to an anode tab 112 to extend in a direction in which the anode tab 112 protrudes. On the other hand, as illustrated in FIG. 1, all of the other ends of the cathode lead 121 and the anode lead 122 protrude to the outside of the battery case 13. As a result, electricity generated in the electrode assembly 10 may be supplied to the outside. Also, since each of the cathode tab 111 and the anode tab 112 is formed to protrude in various directions, each of the cathode lead 121 and the anode lead 122 may extend in various directions.

The cathode lead 121 and the anode lead 122 may be made of materials different from each other. That is, the cathode lead 121 may be made of the same material as the cathode collector, i.e., an aluminum (Al) material, and the anode lead 122 may be made of the same material as the anode collector, i.e., a copper (Cu) material or a copper material coated with nickel (Ni). Also, a portion of the electrode lead 12, which protrudes to the outside of the battery case 13, may be provided as a terminal part and electrically connected to an external terminal.

The battery case 13 is a pouch made of a flexible material. Hereinafter, the case in which the battery case 13 is the pouch will be described. The battery case 13 accommodates the electrode assembly 10 so that a portion of the electrode lead 12, i.e., the terminal part is exposed and then is sealed. As illustrated in FIG. 1, the battery case 13 includes the upper case 131 and the lower case 132. An accommodation space 1331 in which a cup part 133 is formed to accommodate the electrode assembly 10 may be provided in the lower case 132, and upper case 131 may cover an upper side of the accommodation space 1331 so that the electrode assembly 10 is not separated to the outside of the battery case 13. Here, as illustrated in FIG. 1, the cup part 133 having the accommodation space 1331 may be formed in the upper case 131 to accommodate the electrode assembly 10 in the upper portion. As illustrated in FIG. 1, one side of the upper case 131 and one side of the lower case 132 may be connected to each other. However, the present invention is not limited thereto. For example, the upper case 131 and the lower case 132 may be separately manufactured to be separated from each other.

The piezoelectric element 135 is disposed outside the cup part 133 to receive the pressure when the battery case 13 is expanded in volume, thereby supplying the power to the outside. Also, the punching part 136 has the sharp one end 1361. When the power is applied from the piezoelectric element 135, the one end 1361 extends to the battery case 13 to punch the battery case 13. The piezoelectric element 135 and punching part 136 will be described below in detail.

When an electrode lead 12 is connected to the electrode tab 11 of the electrode assembly 10, and the insulation part 14 is provided on a portion of the electrode lead 12, the electrode assembly 10 may be accommodated in the accommodation space 1331 provided in the cup part 133 of the lower case 132, and the upper case 131 may cover an upper portion of the accommodation space. Also, the electrolyte is injected, and the sealing part 134 formed on edges of the upper case 131 and the lower case 132 is sealed. The electrolyte may move lithium ions generated by electrochemical reaction of the electrode during charging and discharging of the secondary battery 1. The electrolyte may include a non-aqueous organic electrolyte that is a mixture of a lithium salt and a high-purity organic solvent or a polymer using a polymer electrolyte. As illustrated in FIG. 2, the pouch type secondary battery 1 may be manufactured through the above-described method.

Figure 3:
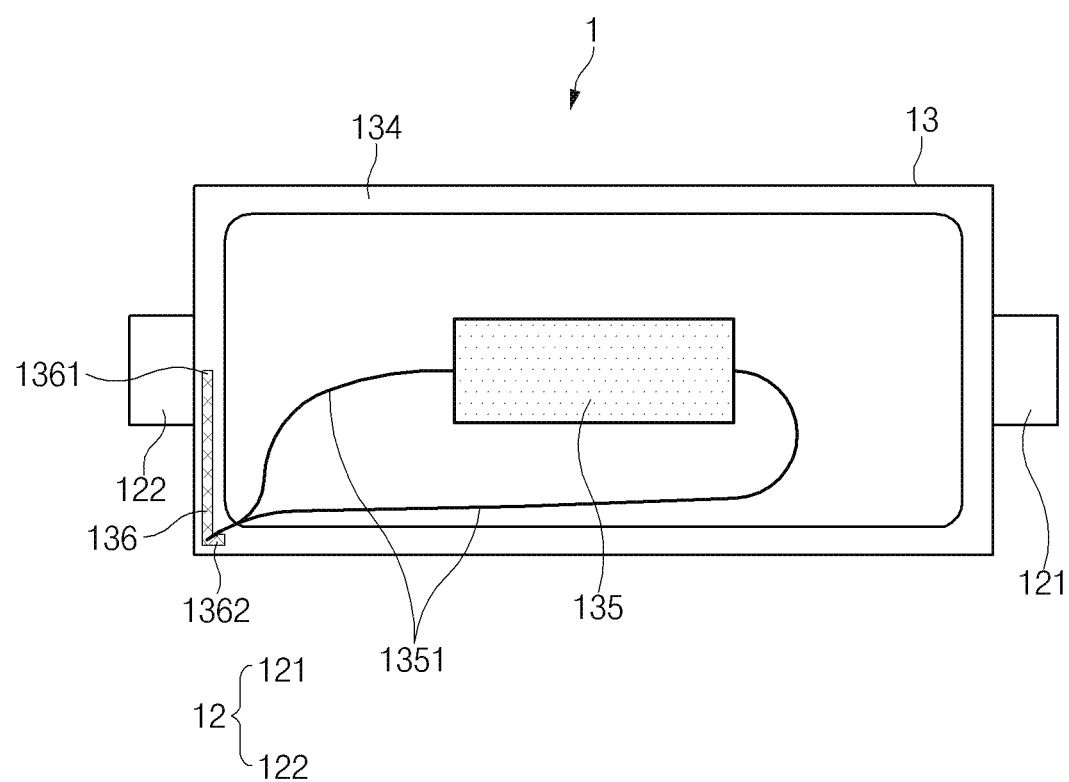
FIG. 3 is plan view of the secondary battery according to an embodiment of the present invention.
Figure 4:
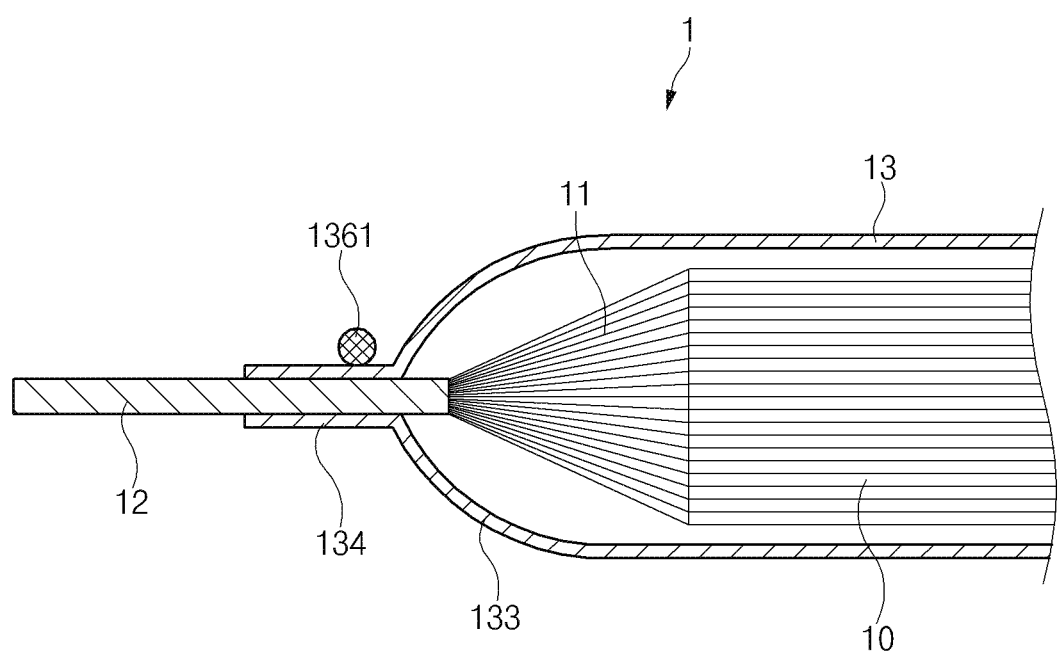
FIG. 4 is an enlarged cross-sectional view of the secondary battery according to an embodiment of the present invention.

FIG. 3 is plan view of the secondary battery 1 according to an embodiment of the present invention, and FIG. 4 is an enlarged cross-sectional view of the secondary battery 1 according to an embodiment of the present invention.

As illustrated in FIG. 3, the secondary battery 1 according to an embodiment of the present invention includes the piezoelectric element 135 and the punching part 136. The piezoelectric element 135 is an element that generates a voltage when physical external force such as a pressure, stress, or the like is applied, and on the contrary, is deformed when a voltage is applied. Typical piezoelectric elements 135 include barium titanate, rochelle salt, and the like.

The piezoelectric element 135 is disposed outside the cup part 133 of the battery case 13. Therefore, when a gas is generated in the battery case 13 to expand a volume of the battery case 13, a pressure is applied. Accordingly, a voltage is generated in the piezoelectric element 135 to supply the power to the outside. In particular, according to an embodiment of the present invention, the piezoelectric element 135 may be directly attached to an outer surface of the cup part 133. As a result, the piezoelectric element may sensitively react to the expansion of the battery case 13. That is, even if the volume of the battery case 13 is slightly expanded, the voltage may be immediately generated to be supplied to the outside.

As illustrated in FIG. 3, the piezoelectric element 135 may have a shape corresponding to that of the cup part 133. For example, if the cup part 133 has a rectangular shape, the piezoelectric element 135 may also have a rectangular shape. If the cup part 133 has a circular shape, the piezoelectric element 135 may also have a circular shape. As a result, when the cup part 133 is deformed, the piezoelectric element 135 may receive a pressure in proportion to a degree of the deformation of the cup part 133.

Also, the piezoelectric element 135 is preferably attached to a substantially central portion of the cup part 133. If a gas is generated inside the battery case 13, the cup part 133 having the greatest flexibility is deformed the largest. Here, the piezoelectric element 135 is attached to the central portion of the cup part 133. When the cup part 133 is deformed, the piezoelectric element 135 may uniformly receive the pressure on the whole.

The punching part 136 may have a thin and long wire shape. When the power is applied to the piezoelectric element 135, the punching part 136 may be deformed to punch the battery case 13. The punching part 136 may be made of an electroactive polymer (EAP). The electroactive polymer is a polymer that is capable of being deformed by expansion, contraction, bending, etc., by electrical stimulation. Representative electroactive polymers include ferroelectric polymers and dielectric elastomers. In particular, relatively high piezoelectric polyvinylidene fluoride (PVDF) polymers are widely used as ferroelectric polymers.

As illustrated in FIG. 4, the punching part 136 may be formed in close contact with the sealing part 134 of the battery case 13. As a result, the punching part 136 may be prevented from being damaged by external friction without largely changing a size and shape of the secondary battery 1. If a length of the punching part 136 is formed to some extent, as illustrated in FIG. 3, the punching part 136 may be in close contact with a portion of the sealing part 134 formed along a peripheral edge in the battery case 13. However, the present invention is not limited thereto, and the punching part 136 may be formed in the battery case 13 in various manners, for example, formed along the outer surface of the cup part 133 accommodating the electrode assembly 10 in the battery case 13.

Figure 5:
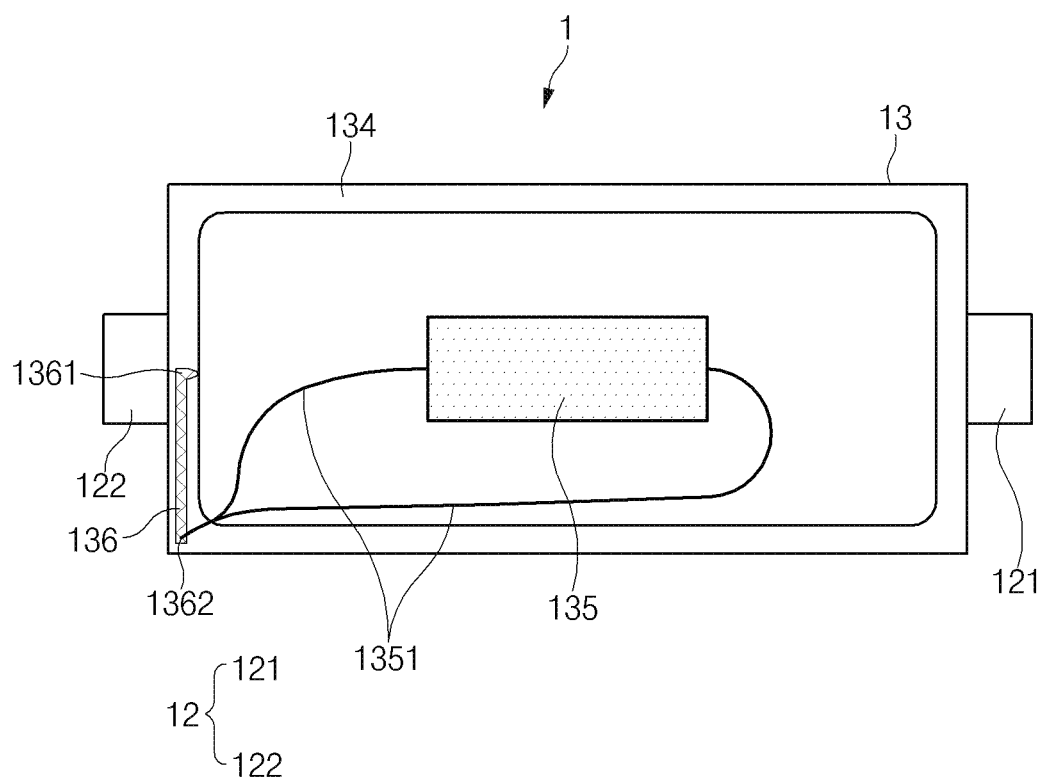
FIG. 5 is a plan view of the secondary battery when one end of a punching part of the secondary battery extends according to an embodiment of the present invention.
Figure 6:
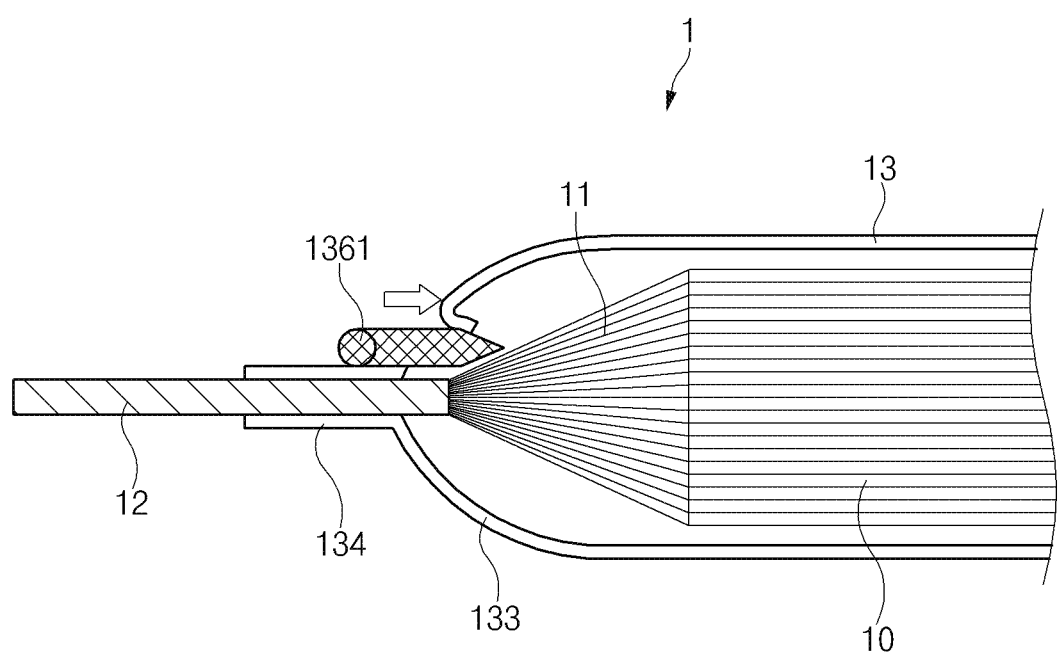
FIG. 6 is an enlarged cross-sectional view of the secondary battery when the one end of the punching part of the secondary battery extends according to an embodiment of the present invention.

FIG. 5 is a plan view of the secondary battery 1 when one end 1361 of the punching part 136 of the secondary battery 1 extends according to an embodiment of the present invention, and FIG. 6 is an enlarged cross-sectional view of the secondary battery 1 when the one end 1361 of the punching part 136 of the secondary battery 1 extends according to an embodiment of the present invention.

When the piezoelectric element 135 receives a pressure, a voltage is generated to supply power to the outside. That is, when a gas is generated in the battery case 13 to expand a volume of the battery case 13, the piezoelectric element 135 may receive the pressure to supply power to the outside. Also, the punching part 136 has a sharp one end 1361 and is changed in shape when power is applied from the piezoelectric element 135. In particular, as illustrated in FIG. 5, the one end 1361 of the punching part 136 extends toward the battery case 13 to punch the battery case 13.

The punching part 136 may preferably punch the cup part 133 in the battery case 13. As a result, the inside and the outside of the battery case 13 is connected to each other, and thus, the gas generated in the battery case 13 may be quickly discharged to the outside to prevent the explosion and secure the stability.

The one end 1361 of the punching part 136 is not disposed near a vertex of the cup part 133 but is disposed at a center of an edge of the cup part 133 as illustrated in FIG. 5. Thus, since the central portion of the edge is weaker than the vicinity of the vertex of the cup part 133, when the one end 1361 of the punching part 136 is extended, as illustrated in FIG. 6, the cup part 133 may be easily punched.

On the other hand, the other end 1362 of the punching part 136 is not disposed at the central portion of the edge of the cup part 133 but disposed near the vertex of the cup part 133, as illustrated in FIG. 5. A conductive wire 1351 connected to the piezoelectric element 135 is connected to the other end 1362 of the punching part 136. As a result, disconnection or damage of the conductive wire 1351 connected to the piezoelectric element 135 due to an external obstacle may be minimized.

Figure 7:
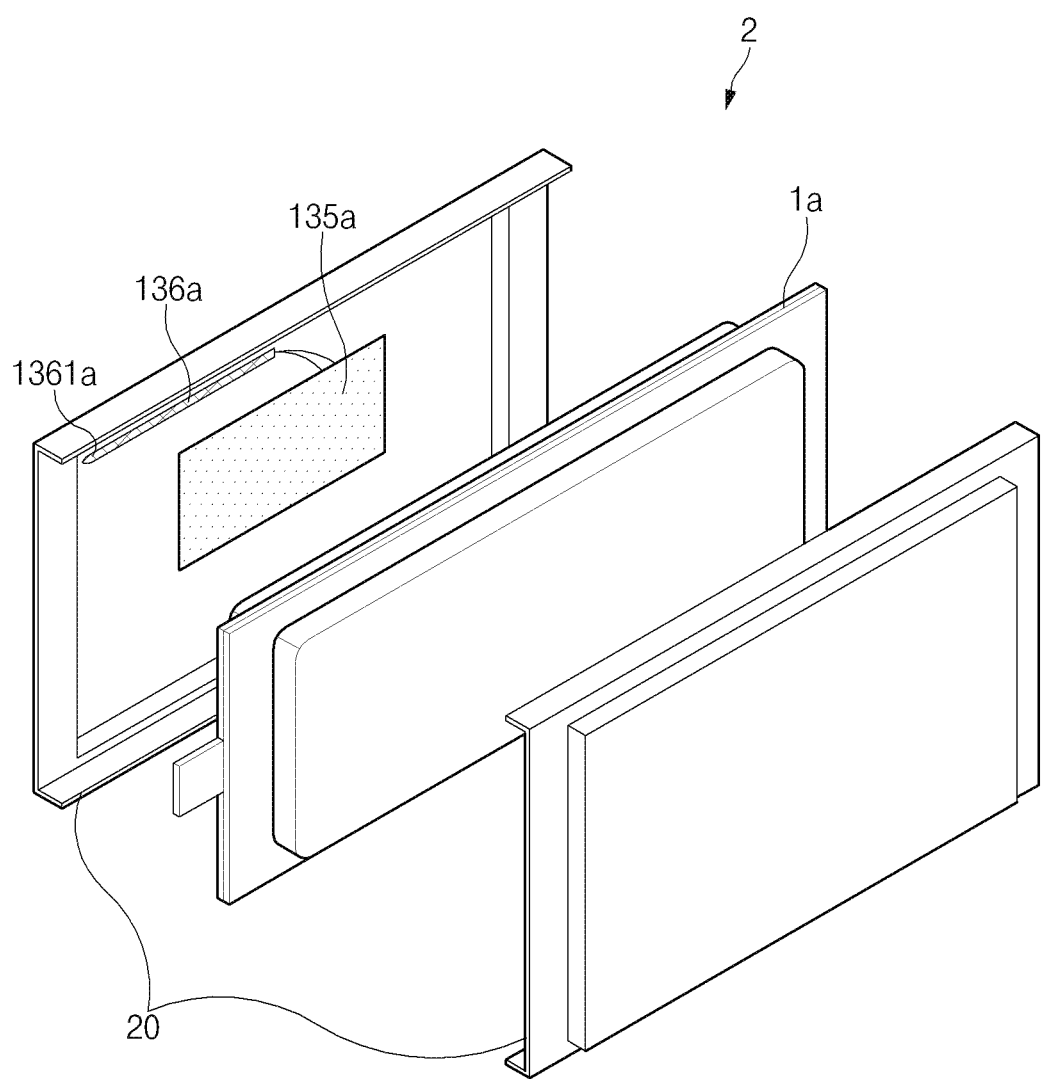
FIG. 7 is an assembly view of a battery module according to another embodiment of the present invention.

FIG. 7 is an assembly view of a battery module 2 according to another embodiment of the present invention.

According to an embodiment of the present invention, the piezoelectric element 135 is directly attached to the outer surface of the cup part 133 of the battery case 13, and the punching part 136 is formed in close contact with the sealing part 134 of the battery case 13. As a result, the piezoelectric element 135 may sensitively react to the expansion of the volume of the battery case 13, and the punching part 136 may be prevented from being damaged by external friction without largely changing a size and shape of the secondary battery 1.

However, according to another embodiment of the present invention, when a secondary battery 1a is assembled to form a battery module 2, a piezoelectric element 135a and a punching part 136a may not be formed in a battery case 13 of the secondary battery 1a, but be formed in the housing 20 of the battery module 2. As a result, it may be easy to fix the piezoelectric element 135a and the punching part 136a to the housing 20 having rigidity rather than the pouch type battery case 13 having flexibility.

The battery module 2 according to another embodiment of the present invention includes: a secondary battery 1a including an electrode assembly 10 formed by alternately stacking an electrode and a separator, a battery case 13 that accommodates the electrode assembly 10 therein, a piezoelectric element 135a disposed outside a cup part 133 accommodating the electrode assembly 10 in the battery case 13 to receive a pressure when the battery case 13 is expanded in volume, thereby supplying the power to the outside, and a punching part 136a which has a sharp one end 1361a and of which the one end 1361a extends toward the battery case 13 to punch the battery case 13 when the power is applied from the piezoelectric element 135a; and a housing 20 accommodating the secondary battery 1a therein.

The housing 20 accommodates the secondary battery 1a therein, and as illustrated in FIG. 7, upper and lower housings 20 are coupled to each other at both sides of the secondary battery 1a to accommodate the secondary battery 1a. The housing 20 may accommodate only one secondary battery 1a therein, but is not limited thereto. For example, the housing 20 may accommodate a plurality of secondary batteries 1a.

The piezoelectric element 135a and the punching part 136a according to another embodiment of the present invention are formed in the housing 200 of the battery module 2. In particular, the piezoelectric element 135a is disposed outside the cup part 133 of the battery case 13, but is attached to an inner surface of the housing 20 without being directly attached to an outer surface of the cup part 133. However, since the inner surface of the housing 20 and the cup part 133 of the battery case 13 are disposed very close to each other, when a gas is generated inside the battery case 13 to expand a volume of the battery case 13, the piezoelectric element 136a immediately supplies power to the outside.

The punching part 136a is formed in close contact with an inner edge of the housing 20. Also, the punching part 136a may have a thin and long wire shape. When the power is applied to the piezoelectric element 135a, the punching part 136a may be deformed to punch the battery case 13. The punching part 136a may be made of an electroactive polymer (EAP).

Figure 8:
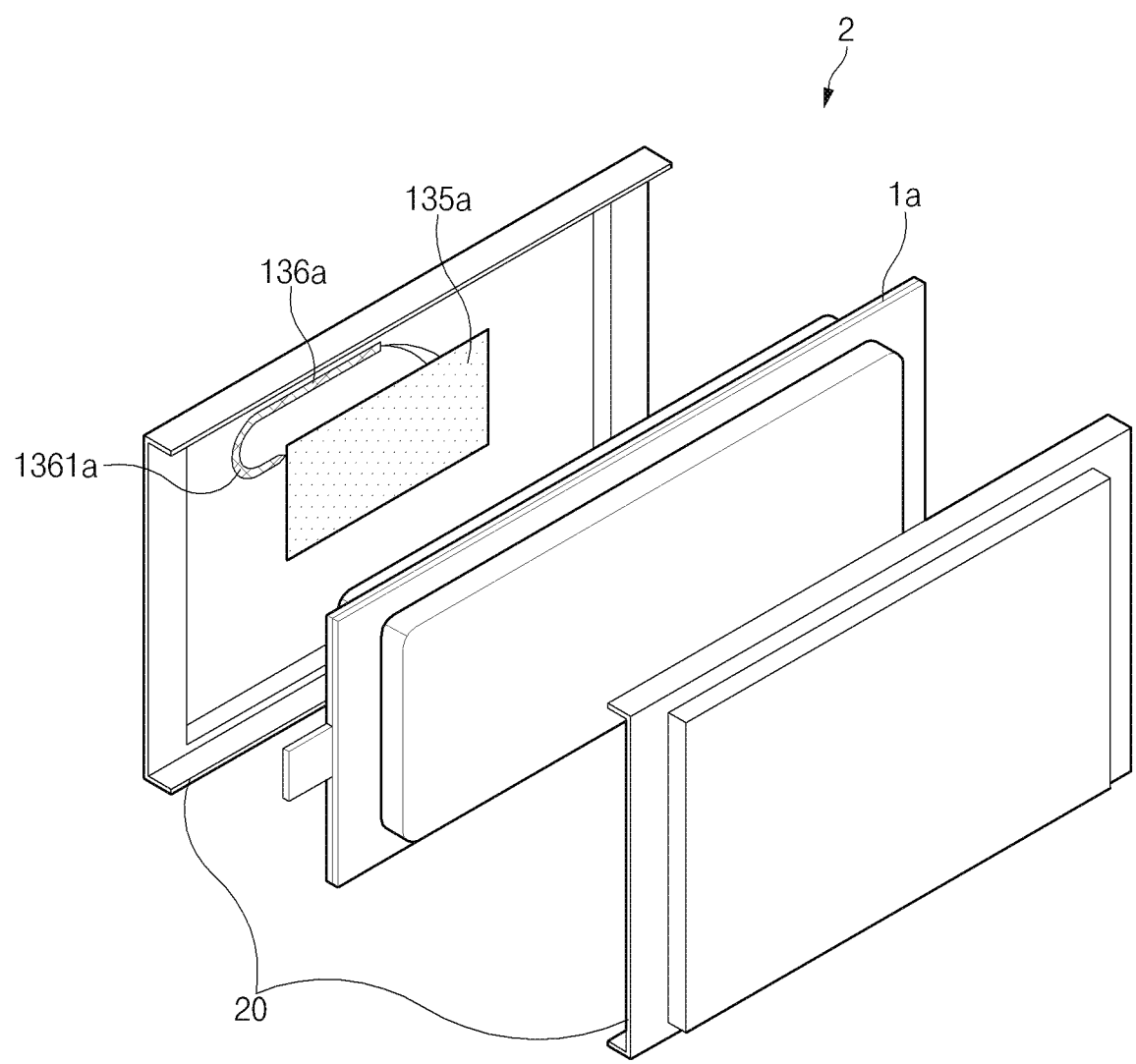
FIG. 8 is an assembly view of the battery module when one end of a punching part of the battery module extends according to another embodiment of the present invention.

FIG. 8 is an assembly view of the battery module 2 when the one end 1361a of the punching part 136a of the battery module 2 extends according to another embodiment of the present invention.

When a gas is generated in the battery case 13 to expand a volume of the battery case 13, the piezoelectric element 135a may receive the pressure to supply power to the outside. Also, since the one end 1361a of the punching part 136a is sharply formed, when the power is applied from the piezoelectric element 135a, as illustrated in FIG. 8, the one end 1361a of the punching part 136a extends toward the battery case 13 to punch the battery case 13.

It is preferable that the punching part 136a punches the cup part 133 of the battery case 13. Also, the one end 1361a of the punching part 136a is disposed at a center of the edge of the cup part 133. As a result, the cup part 133 may be easily punched when the one end 1361a of the punching part 136a extends.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A secondary battery comprising:
an electrode assembly formed by alternately stacking an electrode and a separator;
a battery case accommodating the electrode assembly within a cup part of the battery case;
a piezoelectric element disposed outside the cup part, the piezoelectric element being configured to receive a pressure when the battery case expands in volume, thereby supplying power to the piezoelectric element; and
a punching part that has a sharp end that extends toward a target location on the battery case, the punching part being configured to punch a hole in the target location of the battery case when the power is applied to the piezoelectric element,
wherein the punching part is made of an electroactive polymer (EAP) that is configured to deform when the power is supplied to the piezoelectric element, and
wherein the electroactive polymer is in contact with a sealing part of the battery case.

2. The secondary battery of claim 1, wherein the piezoelectric element is attached to an outer surface of the cup part.

3. The secondary battery of claim 1, wherein the piezoelectric element is attached to a central portion of the cup part.

4. The secondary battery of claim 1, wherein the piezoelectric element has a shape corresponding to a shape of a portion of the cup part.

5. The secondary battery of claim 1, further comprising a conductive wire connected to the piezoelectric element and to another end of the punching part.

6. The secondary battery of claim 1, wherein the target location is on the cup part of the battery case.

7. The secondary battery of claim 1, wherein another end of the punching part is disposed at a vertex of the battery case.

8. The secondary battery of claim 1, wherein the punching part is in contact with a portion of the sealing part extending along a peripheral edge of the secondary battery.

9. A battery module comprising:
a secondary battery comprising:
an electrode assembly formed by alternately stacking an electrode and a separator;
a battery case accommodating the electrode assembly within a cup part of the battery case;
a piezoelectric element disposed outside the cup part, the piezoelectric element being configured to receive a pressure when the battery case expands in volume, thereby supplying the power to the piezoelectric element; and
a punching part that has a sharp end that extends toward a target location on the battery case, the punching part being configured to punch a hole in the target location of the battery case when the power is applied to the piezoelectric element; and
a housing configured to accommodate the secondary battery therein,
wherein the punching part is made of an electroactive polymer (EAP) that is configured to deform when the power is supplied to the piezoelectric element, and
wherein the sharp end of the punching part is disposed at a center of a peripheral edge of the cup part of the battery case, and
wherein the electroactive polymer is in contact with a sealing part of the battery case.

10. The battery module of claim 9, wherein the piezoelectric element is attached to an inner surface of the housing.

11. The battery module of claim 9, wherein the punching part is in contact with an inner edge of the housing.

12. The battery module of claim 9, wherein the target location is on the cup part of the battery case.

13. A battery pack comprising the battery module of claim 9.

14. A device comprising the battery pack of claim 13.

* * * * *